(12) United States Patent
Abraham

(10) Patent No.: US 8,831,198 B1
(45) Date of Patent: Sep. 9, 2014

(54) ABBREVIATED LOGIN FOR CONFERENCING

(71) Applicant: Avaya Inc., Basking Ridge, NJ (US)

(72) Inventor: Jinson Abraham, Broomfield, CO (US)

(73) Assignee: Avaya Inc., Basking Ridge, NJ (US)

( * ) Notice: Subject to any disclaimer, the term of this patent is extended or adjusted under 35 U.S.C. 154(b) by 0 days.

(21) Appl. No.: 13/908,812

(22) Filed: Jun. 3, 2013

(51) Int. Cl.
*H04M 3/42* (2006.01)
*H04M 3/56* (2006.01)

(52) U.S. Cl.
CPC .................................... *H04M 3/56* (2013.01)
USPC ............. 379/202.01; 379/201.01; 379/207.11

(58) Field of Classification Search
USPC ............. 379/201.01, 202.01, 203.01, 204.01, 379/207.11, 207.02
See application file for complete search history.

(56) References Cited

U.S. PATENT DOCUMENTS 8,363,086 B1   1/2013   Shah
8,599,723 B1 *  12/2013   Hecht et al. ................... 370/261

* cited by examiner

*Primary Examiner* — Thjuan K Addy
(74) *Attorney, Agent, or Firm* — Sheridan Ross P.C.

(57) ABSTRACT

The system and method store an address of a communication device (e.g., a telephone number). A system access code of a user and a user access code are also stored (e.g., in a profile). The user access code is associated with the system access code. The user access code is used to simplify access to a conference. A call request with the address is received from the communication device to join a conference. In response to receiving the call request to join the conference, a request for a conference access code is sent to the user. The conference access code is received from the user. In response to receiving the conference access code, the conference access code is compared with the user access code. In response to the conference access code and the user access code matching, the user is logged into the conference using the system access code.

20 Claims, 5 Drawing Sheets

ABBREVIATED LOGIN FOR CONFERENCING

TECHNICAL FIELD

The systems and methods that relate to conferencing systems and in particular to authentication of conferencing systems.

BACKGROUND

Today's telecommunication systems allow users to setup conferences. For example, a host can setup a conference at a conference bridge where the host logs in with a host code and the other participants login using a common participant code. In many instances, the host code and the participant codes are a series of numbers or characters that are not always easy to remember. If the user is at work, the user can access an email or calendar event to look up the access code before calling into the conference.

However, if the user is trying to access the conference using a mobile device, the user may not have easy access to the email or calendar event. For example, the user may be driving. This can cause the user to miss the conference or be delayed in accessing the conference as the user attempts to find out the access code to the conference. What is needed is a way to simplify access to a conference.

SUMMARY

Systems and methods are provided to solve these and other problems and disadvantages of the prior art. The system and method store an address of a communication device (e.g., a telephone number). A system access code of a user and a user access code are also stored (e.g., in a profile). The user access code is associated with the system access code. The user access code is used to simplify access to a conference. A call request with the address is received from the communication device to join a conference. In response to receiving the call request to join the conference, a request for a conference access code is sent to the user. The conference access code is received from the user. In response to receiving the conference access code, the conference access code is compared with the user access code. In response to the conference access code and the user access code matching, the user is logged into the conference using the system access code.

DETAILED DESCRIPTION

Figure 1:
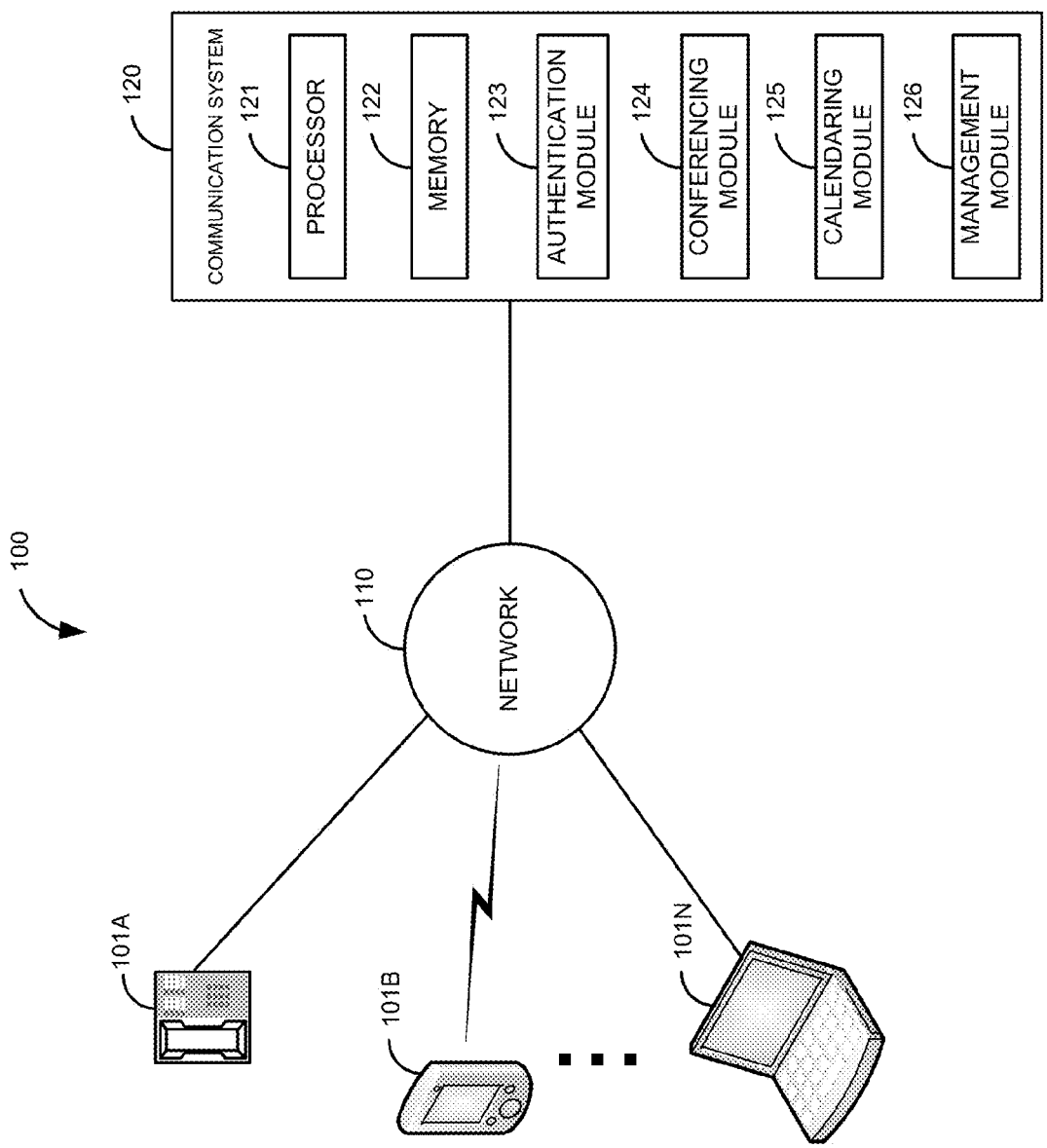
FIG. 1 is a block diagram of a first illustrative system for allowing access to a conference.

FIG. 1 is a block diagram of a first illustrative system 100 for allowing access to a conference. The first illustrative system 100 comprises communication devices 101A-101N, a network 110, and a communication system 120.

The communication devices 101A-101N may be any device that can communicate on the network 110, such as a Personal Computer (PC), a telephone, a video system, a cellular telephone, a Personal Digital Assistant (PDA), a tablet device, a notebook device, and the like. As shown in FIG. 1, any number of communication devices 101A-101N may be connected to the network 110, including only a single communication device 101. In addition, the communication device 101 may be directly connected to the communication system 120.

The network 110 can be any network that can send and receive information, such as the Internet, a Wide Area Network (WAN), a Local Area Network (LAN), the Public Switched Telephone Network (PSTN), a packet switched network, a circuit switched network, a cellular network, a combination of these, and the like. The network 110 can use a variety of protocols, such as Ethernet, Internet Protocol (IP), Session Initiation Protocol (SIP), Integrated Services Digital Network (ISDN), and the like.

The communication system 120 can be any system that can handle communications, such as a central office switch, a Private Branch Exchange (PBX), an audio conference bridge, a video conference bridge, a video mixer, an audio mixer, a video switch, a communication manager, an email system, a calendar system, an Instant Messaging (IM) system, a text messaging system, and/or the like. The various components 121-125 of the communication system 120 are shown as part of the communication system 120. However, in other embodiments, the various components 121-125 may be distributed in various devices across the network 110 or in the communication device 101. For example, the conferencing module 124 may be in one or more of the communication devices 101A-101N. Likewise, the calendaring module 125 may be part of an email system in the network 110. In an embodiment, the authentication module 123 may be separate from the communication system 120.

The communication system 120 further comprises a processor 121, a memory 122, an authentication module 123, a conferencing module 124, a calendaring module 125, and a management module 126. The processor 121 can be any device that processes software, such as a microprocessor, a Digital Signaling Processor (DSP), a multi-core processor, an array of processors, a microcontroller, and/or the like. The memory 122 can be any hardware that can store information, such as a Random Access Memory (RAM), a flash memory, a hard disk, a RAM disk, a flash drive, a cache, and/or the like. The memory 122 can store information in a profile.

The authentication module 123 can be any hardware/software that can provide authentication services, such as a verification system, a digital certificate system, and/or the like. The authentication module 123 can authenticate an access code using a variety of protocols and encryption schemes, such as Secure Sockets Layer (SSL) encryption, Public Key Infrastructure encryption, virtual private network encryption, Diffie-Hellman key exchange, Advanced Encryption Standard (AES), Data Encryption Standard (DES), and/or the like.

The conferencing module 124 can be any hardware/software that can provide conferencing services, such as an audio mixer, a video mixer, a video switch, an audio bridge, a video bridge, a voice switch, an Instant Messaging system, a text messaging system, and/or the like. The calendaring module 125 may be any hardware/software that can provide calendaring services, such as an email system, a collaboration system, and/or the like.

The management module 126 can be any hardware/software that can be used to manage access codes for communication system 120. For example the management module 126 can be accessed by a user or administrator to define system access codes and/or user access codes via the communication device 101. The user/administrator may define the system access codes and/or user access codes via a graphical user interface, via an interactive voice response system, by editing a file, and/or the like.

The memory 122 is configured to store an address of the communication device 101A. The address of the communication device 101A can be provided to the memory 122 in various ways, such as provided by a user of a conference, based on a received caller ID, from a profile stored in the memory 122, and/or the like. In one embodiment, the address of the communication device 101A is a telephone number associated with a second communication device 101B. For example, the telephone number of the communication device 101A (a mobile communication device of the user) is associated with a work telephone (communication device 101B) of the user. In other embodiments, the address can be a Session Initiation Protocol address, an IP address, a network address, an Ethernet address, an email address, and/or the like.

The memory 122 stores a system access code. The system access code may be provided by the user, by the conferencing module 124, based on a calendar event of the user or another user via calendaring module 125, administered by an administrator of the communication system 120, and/or the like. The system access code may be a host code of the user, a participant code of the user, a participant code of another user, and the like. The system access code allows the user to access the communication system 120, the conferencing module 124, a specific conference provided by the conferencing module 124, and/or the like.

The memory 122 stores a user access code. The user access code is associated with the system access code. The user access code is typically a code that is easy to remember and is used in place of the system access code. For example, the user may define the user access code as *h because the *h is associated with a host code of the user. Alternatively, the user may have a second user access code (*p) that is associated with a second system access code (an access code of the user or another user). The second system access code can be used to access a different conference.

The authentication module 123 receives a call request that includes the address from the communication device 101A to join a conference. The conference can be an audio conference, a video conference, an Instant Messaging (IM) conference, a text messaging conference, and/or the like. In response to receiving the call request with the address, the authentication module 123 requests a conference access code from the user. The conference access code can be requested via a voice message (via an Interactive Voice Response (IVR) system), a screen pop-up, a window, a text message, an email, and/or the like.

The user responds by sending the conference access code to the authentication module 123. For example, entering a *h on a keypad of a telephone. The authentication module 123 compares the conference access code with the user access code. In response to the conference access code matching the user access code, the conferencing module 124 logs the user into the conference using the system access code.

To illustrate, consider the following example. Assume that the user has a work phone (communication device 101A) with the telephone number of 123-456-7890 (the address). The user has been given a system access code to be the host of a conference that is 444555666. The user has also defined a user access code of *h. The user calls the communication system 120 to join a conference from the communication device 101A. The authentication module 123 receives the call request to join the conference with the phone number of 123-456-7890. The authentication module 123 requests the conference access code from the user by saying to the user "enter your access code followed by the # key." In this example, because the user has defined a user access code, the user enters *h#. Since the call is from the defined address (123-456-7890), the authentication module 123 compares the entered conference access code (*h) to the stored user access code (*h). Since the two access codes match, the conferencing module 124 logs the user into the conference as a host using the user's system access code of 444555666.

In another embodiment, the user has two associated telephones, the work telephone with the telephone number of 123-456-7890 and a cellular telephone with a telephone number of 123-456-1111. The user has the same system access code (444555666) and user access code (*h). In this example, based on the user calling from the cellular phone with the number 123-456-1111, the system uses a similar process to authenticate the user. In this example, because of the association of the work telephone and the cellular telephone, the authentication module 123 also authenticates the cellular telephone number of 123-456-1111 because of the association with the work telephone. The user is prompted to provide the conference access code. If the user provides the *h conference access code, the user is logged into the conference based on the association of the two telephones using the system access code of 444555666.

Figure 2:
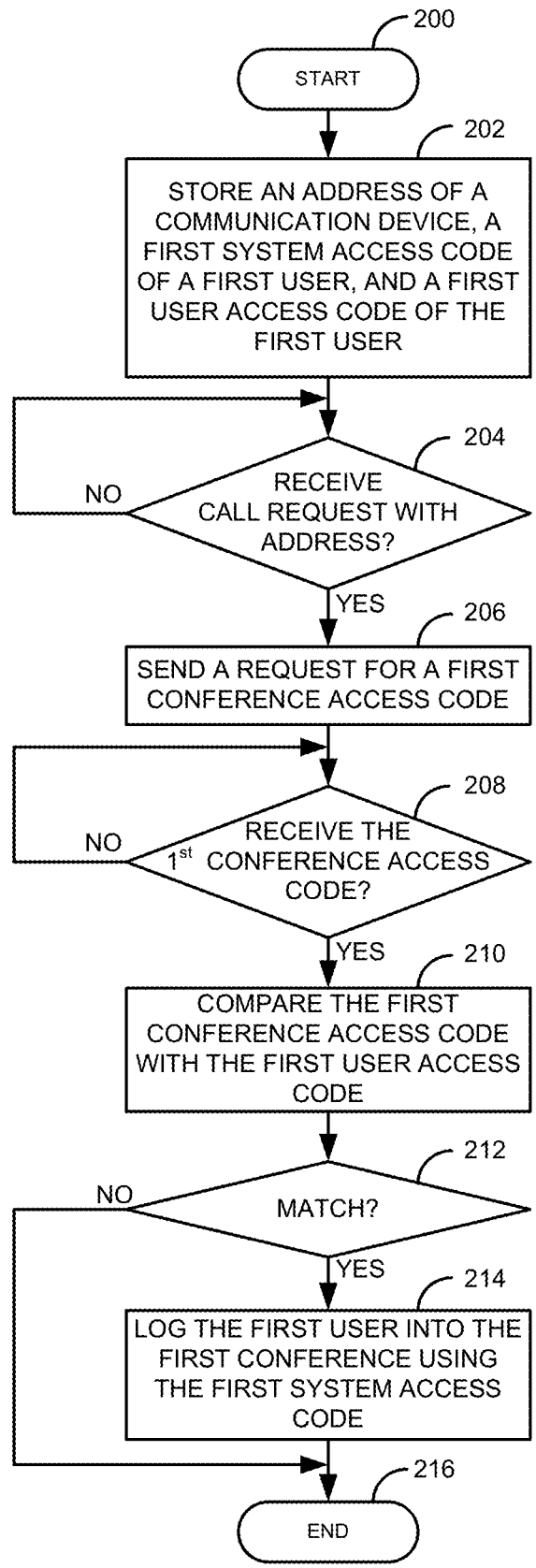
FIG. 2 is a flow diagram of a method for allowing access to a first conference using a user access code associated with a system access code.

FIG. 2 is a flow diagram of a method for allowing access to a first conference using a user access code associated with a system access code. Illustratively, the communication devices 101A-101N, the communication system 120, the authentication module 123, the conferencing module 124, and the calendaring module 125 are stored-program-controlled entities, such as a computer or processor, which performs the method of FIGS. 2-5 and the processes described herein by executing program instructions stored in a tangible computer readable storage medium, such as a memory or disk. Although the methods described in FIGS. 2-5 are shown in a specific order, one of skill in the art would recognize that the steps in FIGS. 2-5 may be implemented in different orders and/or be implemented in a multi-threaded environment. Moreover, various steps may be omitted or added based on implementation.

The process starts in step 200. The address of the communication device, the first system access code, and the first user access code of the first user is stored in step 202. The first participant access code is associated with the first user access code. The process waits to receive a call request that comprises the address in step 204. If a call request is not received with the address in step 204, the process repeats step 204.

Otherwise, if a call request with the address is received in step 204, the process sends 206 a request to the first user for a first conference access code. The process waits to receive the first conference access code from the first user in step 208. If the first conference access code is not received in step 208, the process repeats step 208. Otherwise, if the first conference access code is received in step 208, the process compares 210 the first conference access code with the first user access code. The process determines if there is a match between the first conference access code and the first user access code in step 212. If there is not a match in step 212, the process ends in step 216. Otherwise, if there is a match in step 212, the process logs 214 the first user into the first conference using the first system access code. The process ends in step 216.

Figure 3:
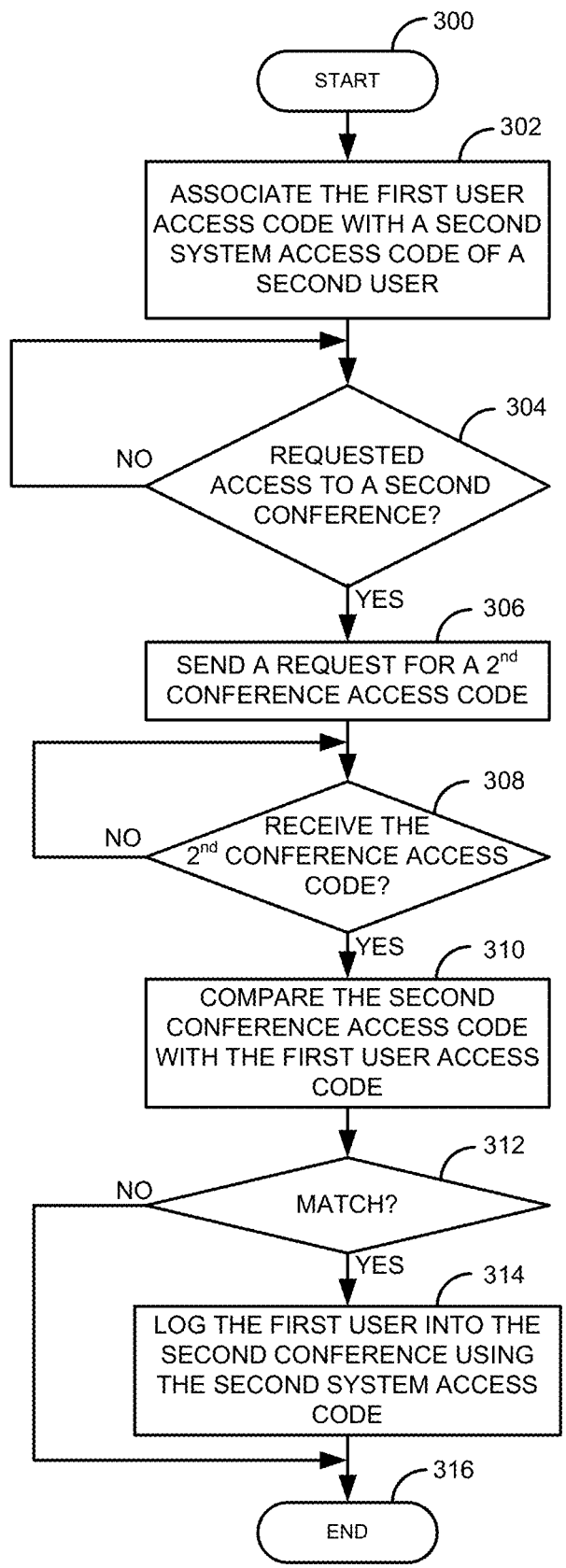
FIG. 3 is a flow diagram of a method for allowing access to a second conference using a user access code associated with multiple conferences.

FIG. 3 is a flow diagram of a method for allowing access to a second conference using a user access code associated with multiple conferences. The process starts in step 300. The process associates 302 the first user access code with a second system access code of a second user. For example, the first user access code (e.g., *ac) is associated with both the user host code of 444555666 (as described in FIG. 2) and a user access code of 999000111 of a second user.

In this example, the user may have to provide clarification as to which conference the user wants to access. For example, the system may have to ask the user if the user wants to access a conference where the user is the host or a conference where the user is a participant and the second user is the host. Alternatively, the system may be able to determine which conference the user wants to join based on the user's calendar information. If the user has both a conference where the user is a host and where the user is a participant in a conference of the second user where both overlap, the process can ask the user which conference the user wants to join.

The process determines if the user has requested to access a second conference (i.e., based on the address of the communication device) in step 304. If the user has not requested access to the second conference, the process repeats step 304. Otherwise, if the process determines that the user has requested access to the second conference in step 304, the process sends 306 a request to the user for a second conference access code. If a second conference access code is not provided in step 308, the process repeats step 308.

Otherwise, if the process receives the second conference access code from the user in step 308, the process compares 310 the second conference access code with the first user access code. The process determines in step 312 if there is a match between the second conference access code and the first user access code. If there is not a match in step 312, the process ends in step 316. Otherwise, if there is a match in step 312, the process logs 314 the first user into the second conference using the second system access code. The process ends in step 316.

To illustrate, consider the following example. Assume that the first user has a work phone (communication device 101A) with the telephone number of 123-456-7890 (the address). The first user has been given a system access code to be the host of a conference that is 444555666. The first user has also defined a user access code of *ac. The first user is also is a participant in a weekly conference where a second user is the host. The first user has been given a system access code of 999000111 to access the second user's weekly conference.

Both the first system access code (444555666) and the second system access code (999000111) are associated with the user access code of *ac. The user calls into the communication system for the scheduled conference call from the user's work phone. The system determines that the call includes the telephone number 123-456-7890 of the user's work telephone. In response the system sends a request for a second conference access code. The user provides the *ac conference access code. The second conference access code (*ac) is compared to the user access code (also *ac). Since there is a match, the user is asked which conference the user wants to participate in. Based on the user responding that he wants to participate in the second conference, the user is logged into the second conference using the second system access code (999000111). The process can determine that the user wants to access the second conference where the second user is host in various ways, such as based on a scheduled calendar event, by asking the user, based on a previous history, based on a called telephone number (e.g., the two conferences are on different conference bridges), and/or the like.

Figure 4:
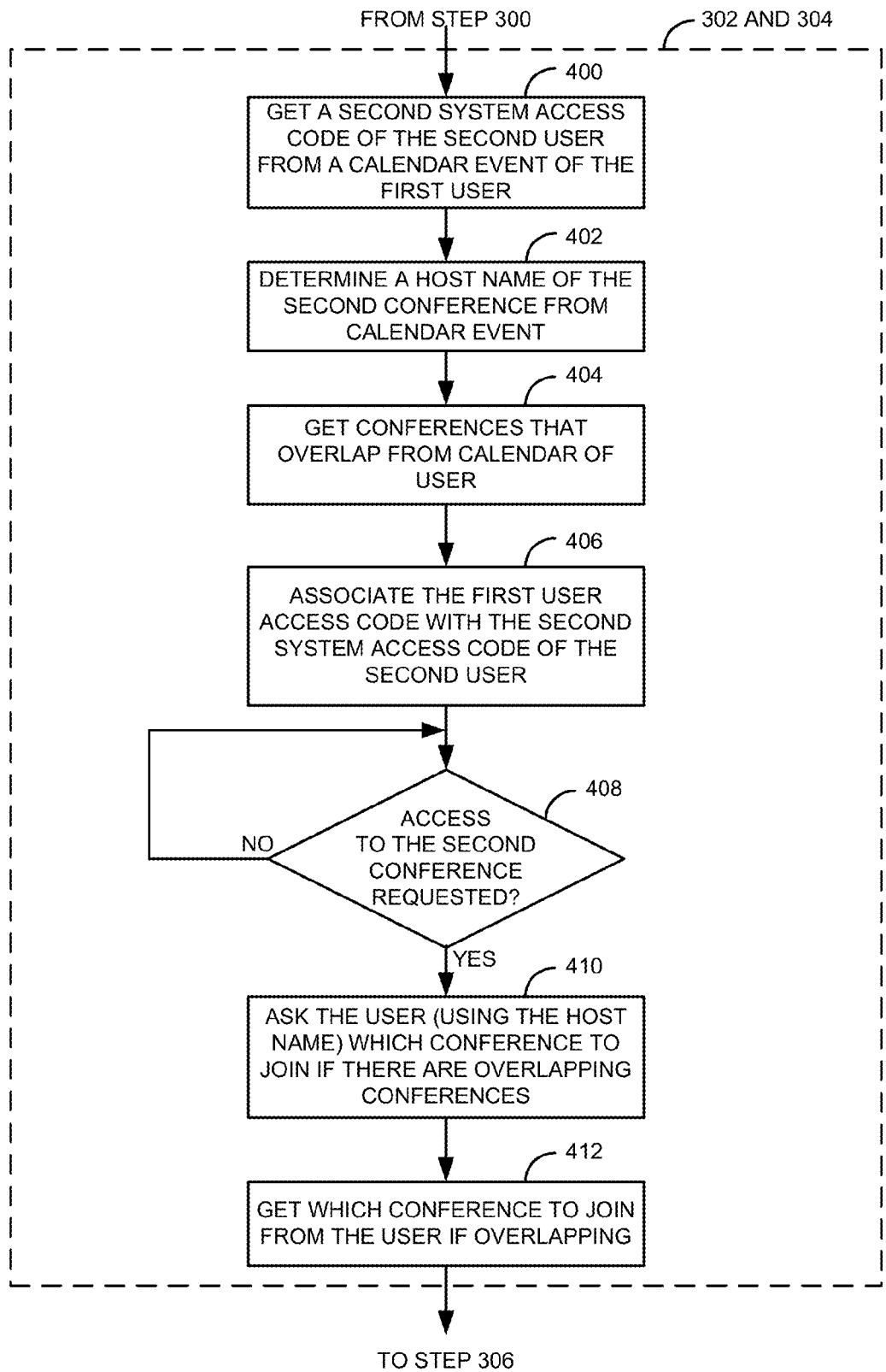
FIG. 4 is a flow diagram of a method for determining conference information from a user's calendar.

FIG. 4 is a flow diagram of a method for determining conference information from a user's calendar. The process is an illustrative example of steps 302 and 304 of FIG. 3. After starting in step 300, the process gets 400 a second system access code of the second user from a calendar event of the first user. For example, the second user may have sent a calendar invite for a reoccurring meeting that the second user hosts. The calendar invite contains the second system access code.

The system determines 402 a host name (the person hosting the conference) of the second conference from the calendar event. For example, the process can determine that the second user who sent the invite is the host based on an identified host code, based on an email address, based on an email, and/or the like. The process gets 404 conferences that overlap from the user's calendar. For example, if the user has a video conference and an Instant Messaging conference that overlap when a call request is received, the process identifies the overlap. The process associates 406 the first user access code with the second system access code (that is taken from the calendar event in step 400).

The process waits in step 408 for the user to request access to the second conference in step 408. If the user does not request access in step 408, the process repeats step 408. If the user does request access in step 408 (e.g., by calling the communication system), the process asks 410, using the host name (determined in step 402) which conference to join if there are conferences that are currently overlapping. For example, if it was determined in step 402 that Jane Doe is the host of the second conference, the system may ask the user if he/she wants to join Jane Doe's conference or the user's conference. The process gets 412 which conference to join from the user if there were overlapping conferences in the user's calendar.

Figure 5:
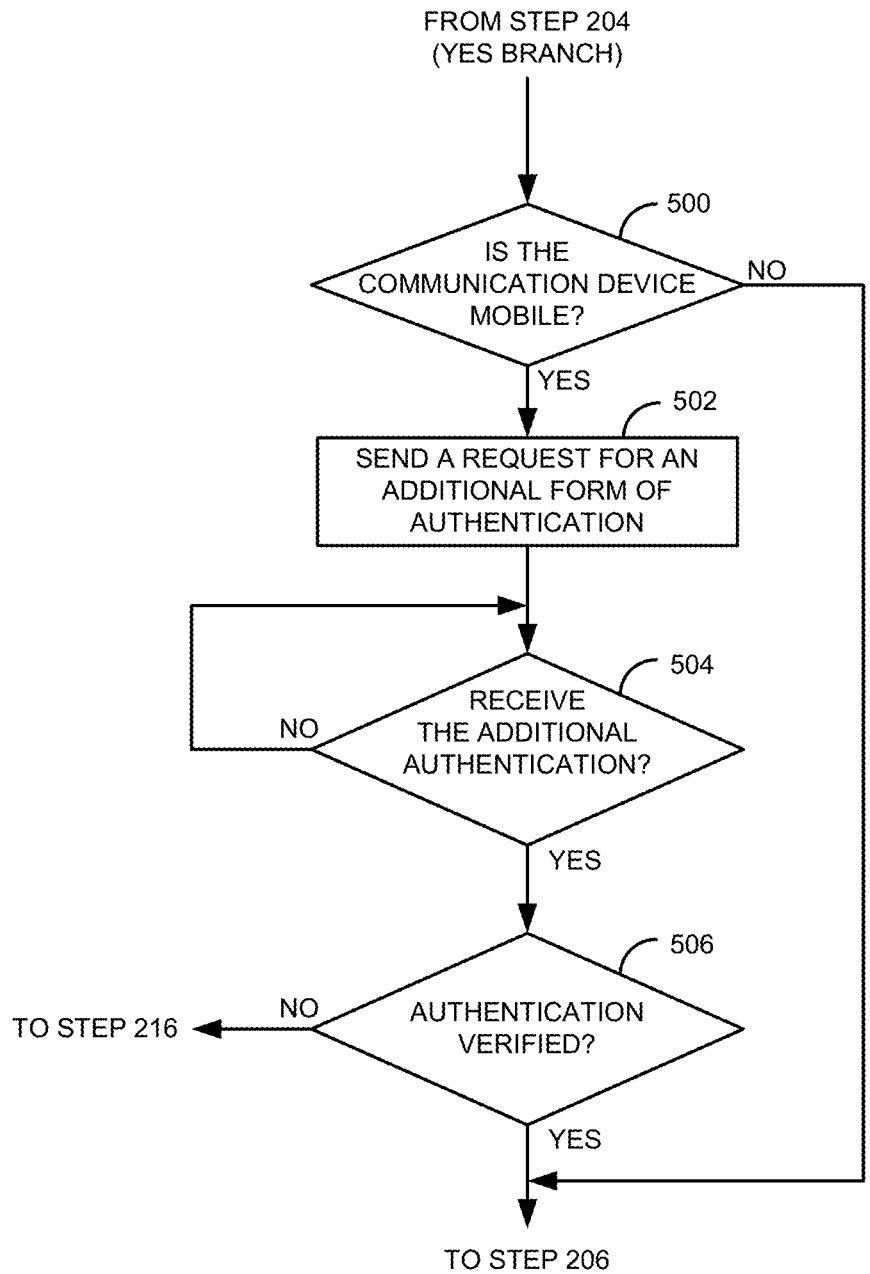
FIG. 5 is a flow diagram of a method for determining if a communication device is mobile.

FIG. 5 is a flow diagram of a method for determining if a communication device is mobile. FIG. 5 is an exemplary embodiment that may be used in conjunction with FIG. 2. The process of FIG. 5 goes between steps 204 and 206 of FIG. 2. The process determines if the communication device is a mobile communication device in step 500. A communication device can be determined as mobile in various ways, such as based on a user definition, based on a location, based on GPS coordinates, and/or the like. If the communication device is not mobile in step 500, the process goes to step 206.

Otherwise, if the communication device is a mobile communication device in step 500, the process sends 502 a request to the user for an additional form of authentication. An additional form of authentication can vary based on the type of communication device. For instance, a form of authentication can be a voice print, a finger print, a password, a RFID card, an iris scan, and/or the like. The process waits in step 504 to receive the additional form of authentication. If the additional form of authentication is not received in step 504, the process repeats step 504.

If the process receives the additional form of authentication in step 504, the process determines if the form of authentication is verified in step 506. If the authentication is not verified in step 506, the process goes to step 216. Otherwise, if the form of authentication is verified in step 506, the process goes to step 206.

Of course, various changes and modifications to the illustrative embodiment described above will be apparent to those skilled in the art. These changes and modifications can be made without departing from the spirit and the scope of the system and method and without diminishing its attendant advantages. The following claims specify the scope of the invention. Those skilled in the art will appreciate that the features described above can be combined in various ways to form multiple variations of the invention. As a result, the invention is not limited to the specific embodiments described above, but only by the following claims and their equivalents.

What is claimed is:

1. A method comprising:
   storing an address of a first communication device;
   storing a first system access code of a first user;
   storing a first user access code of the first user, wherein the first user access code is associated with the first system access code;
   receiving a first call request from the first communication device to join a first conference, wherein the first call request comprises the address;
   in response to receiving the first call request to join the first conference, sending a request for a first conference access code;
   receiving the first conference access code;
   in response to receiving the first conference access code, comparing the first conference access code with the first user access code; and
   in response to the first conference access code and the first user access code matching, logging the first user into the first conference using the first system access code.

2. The method of claim 1, wherein the address is a telephone number of the first communication device.

3. The method of claim 2, wherein the telephone number is associated with a second communication device.

4. The method of claim 3, wherein the first user is logged into the first conference based on the association with the second communication device.

5. The method of claim 1, wherein the first user access code is associated with a second system access code of a second user and further comprising: logging the first user into a second conference using the second system access code, wherein the first user is logged into the second conference based on the first user providing the first user access code.

6. The method of claim 5, wherein the second system access code is determined from a first calendar event of the first user.

7. The method of claim 6, wherein the second conference is hosted by the second user.

8. The method of claim 6, wherein the first conference is defined in a second calendar event of the first user, wherein the first and second conferences overlap when the first call request is received, and further comprising asking the first user which conference to join.

9. The method of claim 8, wherein asking the first user which conference to join further comprises determining a name of a host of the second conference and identifying the second conference based on the name of the host of the second conference.

10. The method of claim 1, further comprising the steps of:
    determining if first communication device is a mobile communication device; and
    in response to determining that the first communication device is a mobile communication device, requesting an additional form of authentication.

11. A system comprising:
    a memory configured to store an address of a first communication device, store a first system access code of a first user, and store a first user access code of the first user, wherein the first user access code is associated with the first system access code;
    an authentication module configured receive a first call request, comprising the address, from the first communication device to join a first conference, send a request for a first conference access code in response to receiving the first call request to join the first conference, receive the first conference access code, and compare the first conference access code with the first user access code in response to receiving the first conference access code; and
    a conferencing module configured to log the first user into the first conference using the first system access code in response to the first conference access code and the first user access code matching.

12. The system of claim 11, wherein the address is a telephone number of the first communication device.

13. The system of claim 12, wherein the telephone number is associated with a second communication device.

14. The system of claim 13, wherein the first user is logged into the first conference based on the association with the second communication device.

15. The system of claim 11, wherein the first user access code is associated with a second system access code of a second user and the conferencing module is further configured to log the first user into a second conference using the second system access code, wherein the first user is logged into the second conference based on the first user providing the first user access code.

16. The system of claim 15, wherein the second system access code is determined from a first calendar event of the first user.

17. The system of claim 16, wherein the second conference is hosted by the second user.

18. The system of claim 16, wherein the first conference is defined in a second calendar event of the first user, wherein the first and second conferences overlap when the first call request is received, and the conferencing module is further configured to ask the first user which conference to join.

19. The system of claim 18, wherein asking the first user which conference to join further comprises determining a name of a host of the second conference and identifying the second conference based on the name of the host of the second conference.

20. A non-transient computer readable medium having stored thereon instructions that cause a processor to execute a method, the method comprising:
    instructions to store an address of a first communication device;
    instructions to store a first system access code of a first user;
    instructions to store a first user access code of the first user, wherein the first user access code is associated with the first system access code;
    instructions to receive a first call request from the first communication device to join a first conference, wherein the first call request comprises the address;
    in response to receiving the first call request to join the first conference, instructions to send a request for a first conference access code;
    instructions to receive the first conference access code;
    in response to receiving the first conference access code, instructions to compare the first conference access code with the first user access code; and
    in response to the first conference access code and the first user access code matching, instructions to log the first user into the first conference using the first system access code.

* * * * *